Sept. 27, 1955 L. H. BEDFORD 2,719,247

CATHODE RAY TUBE FLYING SPOT SCANNERS

Filed March 13, 1952

Inventor:
Leslie Herbert Bedford;
By his attorneys,
Baldwin & Wight

United States Patent Office 2,719,247
Patented Sept. 27, 1955

2,719,247

CATHODE RAY TUBE FLYING SPOT SCANNERS

Leslie Herbert Bedford, London, England, assignor to Marconi's Wireless Telegraph Company Limited, London, England, a company of Great Britain Application March 13, 1952, Serial No. 276,271

Claims priority, application Great Britain March 29, 1951

3 Claims. (Cl. 315—10)

Figure 1:
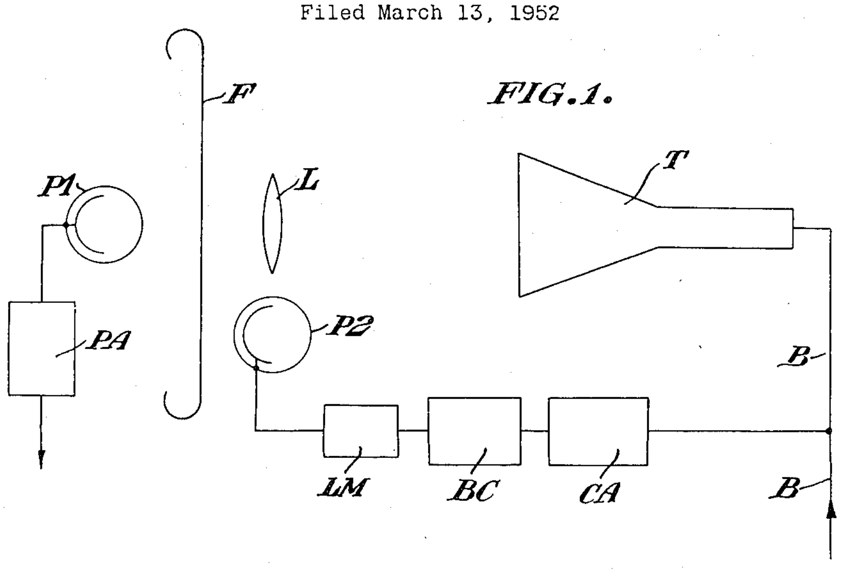

This invention relates to television, tele-cinematograph transmitting and other apparatus of the kind comprising a cathode ray tube scanner of the flying spot type i. e. of the kind in which use is made of a cathode ray tube (C. R. T.) of short after-glow to produce a flying spot of light which scans an area. For the sake of brevity such a scanning arrangement will hereinafter be referred to as a C. R. T. flying spot scanner.

It is a common experience with flying spot scanners that, owing to local faults or blemishes in the fluorescent screen of the tube, the flying light spot may vary undesirably in intensity as it scans thus giving undesired non-uniformity of brightness over the field scanned. Such faults or blemishes may occur in manufacture of the tube or they may occur after manufacture and while the tube is in use, as a result of "burning" of the fluorescent material. This type of difficulty is particularly troublesome in certain telecinematograph systems for generating picture signals from intermittently advanced film which is scanned by a flying spot scanner for in such systems there can readily occur a certain amount of local burning of the screen such as will produce a brightness discontinuity across the area scanned when the film is stationary and a corresponding discontinuity in brightness of the resulting picture produced at a corresponding receiver. In order to eliminate or reduce such effects of local screen and scanner, my invention provides means responsive to light from the flying spot for controlling the cathode ray beam in the tube to compensate for undesired variations in the intensity of said light.

Thus it is known to arrange a photo-electric cell to receive light from the area scanned and to utilize said cell to control a corresponding potential which is applied to the modulator electrode of the tube so that the cathode ray beam thereof is intensified in response to a diminution of light intensity thereby to provide a more constant brightness than would otherwise be obtained.

In many applications however—for example in the tele-cinematograph transmitters above referred to—the electron beam in the scanning tube is momentarily cut out periodically by blanking pulses. If the known expedient above described is applied to such arrangements it will result in generation of correcting voltages due to the blanking periods and these correcting voltages will partly cancel the effect of the blanking pulses applied to the scanner tube. The present invention eliminates this undesirable result by superimposing in the correcting voltage circuit blanking pulses of opposite phase to and of such amplitudes as substantially to cancel out, correcting signals resulting from the blanking signals applied to the tube. Expressed in broad terms the present invention is applicable to an apparatus in which periodic variations in the illumination of the scanned area are required and provided for and consists in preventing the correcting system from interfering with those desired variations by superimposing, in the correcting voltage circuit or a circuit controlled thereby, periodic cancellation voltages which in effect cancel out the correcting voltages which are produced by such variations.

Figure 2:
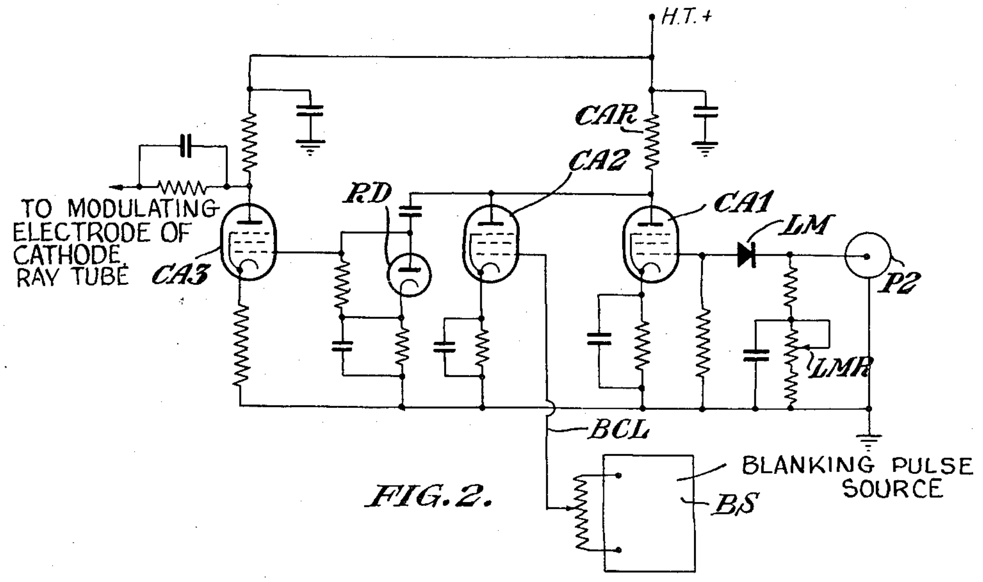

The invention is illustrated in the accompanying drawings in which Fig. 1 is a schematic general diagram of a telecinematograph transmitter arrangement embodying the invention and Fig. 2 is a circuit diagram showing parts of the arrangement of Fig. 1 in more detail.

Referring to Fig. 1 pictures on a film F are scanned by means of a C. R. T. flying spot scanner tube T to which frame and line blanking pulses over a lead B from a blanking pulse source (not shown) are applied to cut off the ray in return line and frame periods. Light from the tube passes through a suitable optical system represented by a lens L on to the film and through the latter to a picture signal generating photo-cell P1 the video signal output from which is passed to the video amplifier PA. In front of the film is placed a second cell P2. To obtain really accurate correction not only for blemishes in the screen of the tube but also for possible other optical faults in the tube e. g. marks on the front plate of the tube, the second cell P2 should be so positioned and associated with an optical system so designed and arranged that both cells have the same "angle of view" of the scanned area. This, however, will usually involve inconvenient complexity and loss of light in the optical apparatus necessary and, in general practice, it is sufficient to arrange the second cell as indicated without any associated optical system, a little below the system through which the film is scanned, the parallax defects resulting from this being ordinarily quite tolerable. Output from the second cell P2 is passed through a limiter LM, a circuit BC in which blanking compensation signals are applied and a short time-constant amplifier CA to the modulating electrode of the tube.

The correcting signal circuit between the second cell P2 and the lead B to the modulator electrode of the C. R. T. is shown in Fig. 2 and includes a three valve amplifier of which the first valve CA1 receives on its input grid, amplitude limited signals from the said cell P2. The amplitude limitation is effected by a germanium crystal LM in the connection between the input grid and the cell, adjustment of limitation being effected by an adjustable resistance LMR included in a suitable resistance-capacity circuit in shunt across the cell output terminals. The first and second valves CA1, CA2 of the amplifier have their anodes connected together and to one end of a common anode resistance CAR and blanking compensation pulses, adjustable in amplitude and derived from the same source BS which applies blanking pulses to the C. R. T. are applied to the control grid of the second valve over lead BCL. Since the two valves have their anodes "commoned" correction voltages resulting from tube blanking and reaching the first valve from the cell P2 are (assuming proper amplitude adjustment) cancelled out in the common anode resistance CAR by blanking compensation pulses reaching the second valve from the blanking pulse source BS. The anodes of the first and second valves are coupled to the control grid of the third valve CA3 across whose grid-cathode circuit is provided a D. C. restoration diode RD as in any well known way. The output of the third valve is fed as correcting voltage to the modulating electrode of the C. R. T. (not shown in Fig. 2). In practice it is desirable to restrict the bandwidth of the amplifier and this may be done—if desired to an adjustable extent—in any convenient known way, e. g. by providing suitable shunt capacity across the anode resistance of the first valve. Fig. 2 is, of course, a simplified diagram and is not intended to show the circuit in complete detail.

I claim:

1. In a cathode ray tube flying spot scanner apparatus wherein periodic desired variations in the illumination of the scanned area are provided for, a photo-electric cell responsive to light from the flying spot for producing a control voltage, a cathode ray tube including a modulator electrode and a focussing electrode and means for applying said voltage to said modulator electrode in said tube to intensify the cathode ray beam thereof in response to a diminution of light intensity, means for superimposing on said control voltage periodic cancellation voltages synchronous with said periodic desired variations and substantially cancelling out said control voltage, and, in addition, means for applying to said focussing electrode in said tube, a compensating voltage derived from the output of said photo-cell so as to maintain the electron beam in focus.

2. In a cathode ray tube flying spot scanner apparatus wherein periodic desired variations in the illumination of the scanned area are provided for, a photo-electric cell responsive to light from the flying spot for producing a control voltage, a cathode ray tube including a modulator electrode, means for applying said voltage to a modulator electrode in said tube to intensify the cathode ray beam thereof in response to a diminution of light intensity, means for superimposing on said control voltage periodic cancellation voltages synchronous with said periodic desired variations and substantially cancelling out said control voltage, said tube being provided with after-glow correction circuits, means for changing the time constants of the same and means controlled by compensating voltage derived from the photo-cell for maintaining the electron beam in focus.

3. In a cathode ray tube flying spot scanner apparatus wherein periodic desired variations in the illumination of the scanned area are provided by applying periodic blanking pulses to the tube of said apparatus, a photo-electric cell positioned and arranged to receive light from the area scanned, an amplifier valve fed with output derived from said cell, a second amplifier valve fed with pulses of predetermined amplitude and derived from said periodic blanking pulses, the two amplifier valves having a common output resistance, and means for applying voltage derived from said common output resistance to control the intensity of the cathode ray beam in the tube.

References Cited in the file of this patent

UNITED STATES PATENTS

| | | |
|---|---|---|
| 2,188,679 | Dovaston et al. | Jan. 30, 1940 |
| 2,415,191 | Rajchman | Feb. 4, 1947 |
| 2,642,550 | Williams | June 16, 1953 |